March 13, 1945.  E. L. CRANDELL  2,371,571
MANUFACTURE OF FOOTWEAR
Original Filed April 10, 1941

Inventor.
Ervin L. Crandell.
by
John F. Smith
Attorney.

Patented Mar. 13, 1945

2,371,571

UNITED STATES PATENT OFFICE 2,371,571

MANUFACTURE OF FOOTWEAR

Ervin L. Crandell, Wellesley, Mass., assignor to Compo Shoe Machinery Corporation, Boston, Mass., a corporation of Delaware Original application April 10, 1941, Serial No. 387,823. Divided and this application November 3, 1943, Serial No. 508,787

2 Claims. (Cl. 12—142)

This invention relates to the manufacture of footwear, and more particularly to a form of manufacture wherein shoes, or certain parts thereof, are heated by the action of a high frequency electrical field to activate heat responsive materials in the shoe construction, such as thermoplastic bonding adhesives.

This application is a division of my copending application, Serial No. 387,823 which was filed April 10, 1941.

General objects of the invention are to provide shoe constructions and shoe making methods wherein an electrically conductive material such as metallic foil or mesh is incorporated as a permanent component of the shoe construction in such a manner as conveniently to enable its use as an electrode employed in setting up a heating field.

More particularly, objects of the invention are to provide shoe parts adapted to be permanently incorporated in a shoe at or near portions thereof which are to be thermally treated by the heating action of an energized electric field, wherein such parts include a ply of electrically conductive material capable of being arranged in that portion of the finished shoe which is to be thermally treated.

Further objects of the invention are to provide a cement sole attaching construction and method wherein a thermoplastic adhesive is placed between the outsole and the lasted upper and is subjected to the heating effect of an electrostatic field set up between electrodes, one or more of which is located beneath the outsole, and another of which forms a component part of the shoe construction, such as an insole or an upper.

Other objects of the invention will in part be obvious and will in part appear hereinafter.

The invention accordingly comprises the several steps and the relation of one or more of such steps with respect to each of the others, and the articles possessing the features, properties, and the relation of elements, which are exemplified in the following detailed disclosure, and the scope of the invention will be indicated in the claims.

Figure 1:
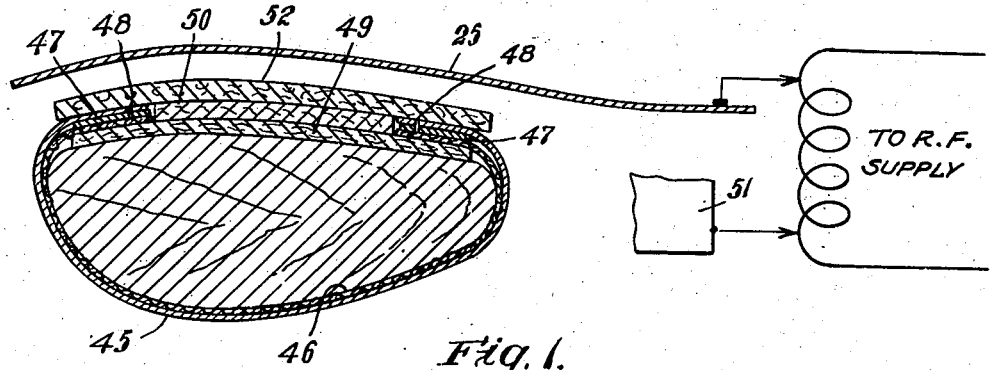
Figure 2:
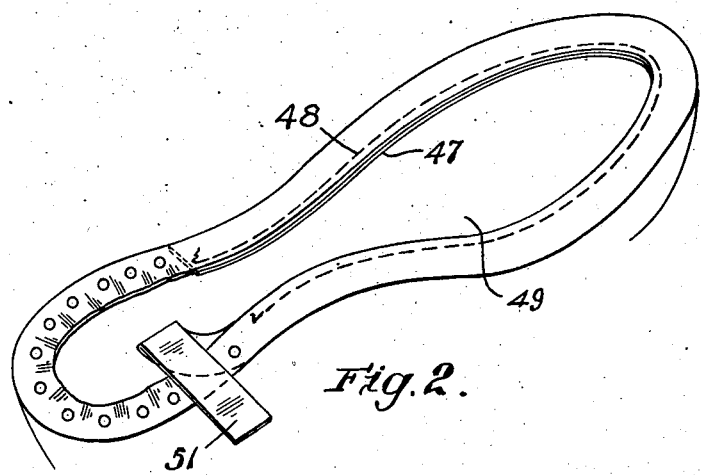

For a fuller understanding of the nature and objects of the invention reference should be had to the following detailed description taken in connection with the accompanying drawing, in which:

Fig. 1 is a transverse vertical sectional view across the forepart of a shoe having a special upper embodying features of the invention and showing a fragmentary portion of an electrode equipped sole pressing pad associated therewith, and Fig. 2 is a partial plan view of the shoe structure shown in Fig. 1, the outsole being removed.

The present invention generally contemplates using a high frequency source of inductive heating such as that described in the patent to E. C. Pitman, No. 2,087,480, issued July 20, 1937, and a thermoplastic or thermosetting adhesive or plastic which is heated on or between plies of other materials by the action of the high frequency energized field.

The Pitman patent discloses that when attaching outsoles to shoes, this field may be set up between an electrode on the last bottom and one on the sole pressing pad of a sole affixing press, which embraces the shoe bottom including the sole bonding area between them. In factories where the lasts have no metal bottom, or where, for some reason, such bottoms cannot readily be employed for electrode purposes, it is necessary in such an arrangement to provide a special electrode on the last bottom, of the kind shown, for example, in the Smith Patent No. 2,240,867.

The present invention contemplates avoiding the trouble and expense of refitting lasts in this manner by incorporating an inexpensive conductive electrode ply in or on at least one portion of the shoe part itself at a point adjacent the thermoplastic together with means for connecting such insole electrode in a high frequency circuit.

The structure comprises a shoe upper 45 and a lining 46. Around the lasting allowance the strip of metallic foil or the like 47 which is secured to the upper by the stitches 48 or by any suitable adhesive is placed between the upper 45 and the lining 46. The entire upper is shown lasted over a conventional insole 49, its lasting allowance having been roughed, cemented, and the filler piece 50 and outsole 52 in place ready for the sole affixing operation.

The electrode 47 sandwiched between the upper 45 and the lining 46 is provided with an extension 51 as shown in Fig. 2 to serve as a connection to the high frequency electrical source. This extension 51 can readily be formed by allowing the foil to continue beyond the heel breast line and then allowing it to protrude out between the lining and the upper and simply bending same over, substantially as shown.

In making a shoe the insole is located on the last bottom with the electrode tongue 51 in contact with a conductor connected to a source of radio frequency energy. The lasting allowances of the upper and of an outsole 52 are then roughed and coated with an adhesive, preferably one of the types described in the mentioned Pitman Patent No. 2,087,480, such as vinyl resin in a toluol solution. The adhesive may be allowed to dry through evaporation of the solvent ready for subsequent activation by a high frequency electrostatic field. This field is applied by placing the shoe and outsole in a suitable shoe press, not shown, having a flexible electrode associated with its sole engaging pad and underlying at least the shank and forepart areas of the shoe sole. Such an electrode 25 is diagrammatically represented by Fig. 1, being shown opposed to the metallic foil or mesh electrode 47 forming a component part of the upper. The shoe press pad electrode is shown connected to the one side of any suitable type of high frequency generator, while the electrode extension 51 is connected with the other side of such a circuit. If desired, the upper electrode may be connected with the power side of a high frequency generator circuit and the shoe press pad electrode grounded, or the opposed electrodes may be connected with opposite sides of a push-pull oscillator circuit, all as is well understood in the art of generating high frequency current. While the shoe is held in the press under suitable sole affixing pressure, an electrostatic field is set up between the upper and pad electrodes, preferably at the frequency of 20 to 25 megacycles over a suitable period of time and at a suitable power value, although these features, including the frequency employed, will depend on the individual shoe construction, type of adhesive, etc., and are unnecessary to an understanding of the use of the particular electrode construction herein claimed.

Since certain changes in carrying out the above process, and certain modifications in the articles which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. A method of making shoes which comprises securing an electrode strip to the lasting allowance of an upper, lasting said upper and electrode strip over an insole, applying a coating of adhesive to the overlasted portion of said upper, pressing an outsole to the assembly and heating said adhesive in an electrostatic field produced by means including said electrode strip to permanently secure said outsole to said upper.

2. A method of making shoes which comprises securing an electrode strip to the lasting allowance of an upper and between same and the shoe lining, lasting said upper, said lining and said electrode strip over an insole, applying a coating of adhesive to the overlasted portion of said upper, pressing an outsole to the assembly and heating said adhesive in an electrostatic field produced by means including said electrode strip to permanently secure said outsole to said upper.

ERVIN L. CRANDELL.